(12) United States Patent
Meledones et al.

(10) Patent No.: US 12,413,853 B1
(45) Date of Patent: Sep. 9, 2025

(54) CINEMA CAMERA COMMUNICATION AND CONTROL DEVICE

(71) Applicants: Damon William Meledones, Baltimore, MD (US); Curtis Warren Abbott, V, Pittsburgh, PA (US); Ian Cooper Mcgavin Edwards, Forest Hills, NY (US); Robert Fletcher Babb, III, Stockholm (SE)

(72) Inventors: Damon William Meledones, Baltimore, MD (US); Curtis Warren Abbott, V, Pittsburgh, PA (US); Ian Cooper Mcgavin Edwards, Forest Hills, NY (US); Robert Fletcher Babb, III, Stockholm (SE)

( * ) Notice: Subject to any disclaimer, the term of this patent is extended or adjusted under 35 U.S.C. 154(b) by 0 days.

(21) Appl. No.: 18/645,033

(22) Filed: Apr. 24, 2024

(51) Int. Cl.
*H04B 1/40* (2015.01)
*H04N 23/661* (2023.01)

(52) U.S. Cl.
CPC ............ *H04N 23/661* (2023.01); *H04B 1/40* (2013.01)

(58) Field of Classification Search
CPC ................................ H04N 23/661; H04B 1/40
See application file for complete search history.

(56) References Cited

U.S. PATENT DOCUMENTS

| | | | |
|---|---|---|---|
| 5,691,732 A * | 11/1997 | Tsuru ................... | H01Q 9/0421 343/702 |
| 5,861,851 A * | 1/1999 | Chang .................. | H04B 1/3877 343/702 |
| 6,781,959 B1 * | 8/2004 | Garakani .............. | H04L 41/069 709/203 |
| 7,096,272 B1 * | 8/2006 | Raman .................... | H04L 45/00 709/231 |
| 11,018,935 B1 * | 5/2021 | Nachum ............. | H04L 41/0826 |
| 2004/0012701 A1 * | 1/2004 | Nagai .................... | G06F 1/1616 348/333.12 |
| 2005/0138557 A1 * | 6/2005 | Bolder ................ | H04L 41/0826 715/700 |
| 2012/0274518 A1 * | 11/2012 | Ying ...................... | H01Q 21/28 343/702 |
| 2013/0250946 A1 * | 9/2013 | Meng .................... | H04L 1/0009 370/389 |
| 2014/0009881 A1 * | 1/2014 | Kinoshita ............. | G06F 1/1637 361/679.28 |

(Continued)

FOREIGN PATENT DOCUMENTS

WO 2015157569 A1 10/2015

*Primary Examiner* — Dominic E Rego
(74) *Attorney, Agent, or Firm* — Colin Cochran, Cochran Legal, LLC

(57) ABSTRACT

The cinema camera communication and control device is a wireless communication device comprising a circuit board having a processor, an algorithm, a power connection to a power source, and a wireless communication device housed within a chassis in the form of a rectangular box, a recessed antenna connection, and a remote antenna mount. The disclosed invention enables synchronized control and communication for cinema camera operators with the ability to dynamically change between USB-C PD (Power Delivery) sink and USB-C PD (Power Delivery) source power modes and negotiate a connection with Ethernet devices that exclusively use 1000 Mbps Ethernet without needing additional software or an external USB-to-Ethernet adapter.

11 Claims, 3 Drawing Sheets

(56) References Cited

U.S. PATENT DOCUMENTS

| | | | |
|---|---|---|---|
| 2015/0270595 A1* | 9/2015 | Okada | H01P 5/024 |
| | | | 333/254 |
| 2016/0109790 A1* | 4/2016 | Yeh | G03B 21/145 |
| | | | 353/119 |
| 2016/0134864 A1* | 5/2016 | Regev | H04L 43/12 |
| | | | 348/192 |
| 2017/0034416 A1 | 2/2017 | Heilman et al. | |
| 2017/0265603 A1* | 9/2017 | Ronsen | A44B 18/0007 |
| 2019/0254095 A1* | 8/2019 | Eriksen | G07C 9/00857 |
| 2019/0377382 A1* | 12/2019 | Ueki | G06F 1/1633 |
| 2020/0084900 A1* | 3/2020 | McDowell | H05K 5/0213 |
| 2020/0127384 A1* | 4/2020 | Thakur | H01Q 1/2266 |
| 2020/0203839 A1* | 6/2020 | Karhade | H01Q 9/0414 |
| 2020/0314398 A1* | 10/2020 | Zhang | H04N 9/31 |
| 2020/0329474 A1* | 10/2020 | Shin | H04L 27/26025 |
| 2020/0329583 A1* | 10/2020 | Varadarajan | F04D 25/066 |
| 2021/0385889 A1* | 12/2021 | Patel | A61B 17/00 |
| 2022/0076552 A1* | 3/2022 | Kim | G06F 18/22 |
| 2022/0141770 A1* | 5/2022 | Ahn | H04W 52/0235 |
| | | | 370/318 |
| 2022/0256443 A1* | 8/2022 | Bleidorn-Piper | H04W 48/16 |
| 2022/0332953 A1* | 10/2022 | Ishikawa | C01G 49/00 |
| 2023/0260550 A1* | 8/2023 | Shires | H04N 21/23424 |
| | | | 386/241 |
| 2024/0201158 A1* | 6/2024 | Miller | G01N 33/0016 |
| 2024/0222850 A1* | 7/2024 | Oh | H01Q 1/243 |
| 2024/0276535 A1* | 8/2024 | Chien | H04W 72/542 |
| 2024/0315738 A1* | 9/2024 | Baccelli | A61B 17/7062 |
| 2024/0328155 A1* | 10/2024 | Guo | E04B 9/006 |

\* cited by examiner

CINEMA CAMERA COMMUNICATION AND CONTROL DEVICE

STATEMENT REGARDING PRIOR DISCLOSURES BY THE INVENTOR OR JOINT INVENTOR

The invention was disclosed to Aidan Gray on Sep. 1, 2022, to Taixin Semi (aka Huge-IC) on Mar. 9, 2023, to Hedgehog OÜ (including Indrek Rebane, Mihkel Heidelberg, Egert Vahter, and Liina Roots) on Mar. 30, 2023, to Testonica (Igor Aleksejev et al.) on Apr. 19, 2023, to Kyle Burk of CircuitBoardLayout.com on Apr. 20, 2023, to Boni Bonev of b2b ltd on Apr. 24, 2023, to Morse Micro and their partners on May 9, 2023, to Alin Panaitiu of The low-tech guys on May 11, 2023, to Sunfire Enterprises, LLC (Tim Payne) on Jun. 7, 2023, to Seio OÜ (Mihkel Güsson) on Jun. 9, 2023, to Bruce Santos of Product Design Experts, Adam Shepperdley of SHEPP Industrial Design Inc., and Kickstart Design LLC on Jun. 19, 2023, to Abtin Valerie Design Studio, Fabio Salvador, Hunter Arvin of Design Prototype Consult LLC, Andrew Bowen of Unbox Product Development, Eric Bergman, DeepSea Developments Inc. (Nick Velasquez et al), and Chris Buttenob of Radiant Product Development on Jun. 20, 2023, to Cyanview S. A. (David Bourgeois, et al.), and Micron Laser Technology (Troy Dowdy et al) on Jan. 2, 2024, to MacroFab (Fernanda de Mattos et al) on Jan. 9, 2024, to Ben Hagen of OTTOMATIC GmbH on Jan. 17, 2024, to Mindsailors (Thomas Weber et al) on Jun. 22, 2023, to Teledatics Incorporated on Jan. 30, 2024, to Yu Hu (aka Hannah) on Feb. 1, 2024, and to Jamie Metzger of Amco Digital LLC in March 2024.

BACKGROUND OF THE INVENTION

Technical Field

This invention relates generally to a cinema camera communication and control device. This invention relates more particularly to an apparatus/device for communication and control among multiple simultaneously operating cinema cameras.

This invention relates generally to apparatuses and devices for cinema camera communication and control in the field of filmmaking. This method also can be used with external devices other than cinema cameras such as tablet computers.

This invention relates more particularly to a wireless communication device comprising a circuit board having a processor, an algorithm, and a power connection to a power source, and a wireless communication means housed within a chassis in the form of a rectangular box, a recessed antenna connection, and a remote antenna mount to facilitate better communication and control among multiple simultaneously operating cinema cameras with the ability to dynamically change between USB-C PD (Power Delivery) sink and USB-C PD (Power Delivery) source power modes, and to negotiate a connection with other Ethernet devices that use 1000 Mbps Ethernet.

Background Art

It is known in the prior art that there exists a system and method for remote control of an electronic device using an adapted server device. It is also known in the prior art that there exists a camera communication method and system that relies on an LTE hub connected to a cloud service based on a SIM card of a mobile operator that can facilitate automatic network distribution. There also exists an intercom device that enables speech between a TV cameraman and TV camera console in which an intercom is sent via wireless space communication with the use of infrared rays between two optical communication devices.

The prior art additionally discloses a data transmission method that uses Bluetooth and WiFi HaLow in a wireless sensor network environment with fixed and mobile sensors as well as a camera stream adjustment method and device based on WiFi HaLow that adjusts video data for video transmission efficiency. Finally, the prior art discloses film and television artificial intelligence based on SLAM, in which video information can be interactively captured from socialized big data video information and a film and television program is automatically generated by a computer through an inference machine and a knowledge base.

What there is not is a wireless cinema camera communication and control device wherein said device is capable of negotiating a connection with Ethernet devices that exclusively use 1000 Mbps Ethernet without additional software or adapters that have the ability to dynamically change between USB-C PD (Power Delivery) sink and USB-C PD (Power Delivery) source power modes and/or a cheese plate with a plurality of mounting means/methods built into the cheese plate itself.

In light of the foregoing prior art, there is a need for a cinema camera communication and control device to better enable synchronized communication between multiple users and to enable control and communications for cinema camera operators via the ability to dynamically change between USB-C PD (Power Delivery) sink and USB-C PD (Power Delivery) source power modes, and the ability to negotiate a connection with Ethernet devices that exclusively use 1000 Mbps Ethernet, i.e., devices that are incompatible with 10 or 100 megabit Ethernet protocols, without needing additional software or an external USB-to-Ethernet adapter.

BRIEF SUMMARY OF THE INVENTION

The cinema camera communication and control device is a wireless communication device comprising a circuit board having a processor, an algorithm, a power connection to a power source, and a wireless communication means housed within a chassis in the form of a rectangular box, a recessed antenna connection, and a remote antenna mount. The disclosed invention enables synchronized control and communication for cinema camera operators with the ability to dynamically change between USB-C PD (Power Delivery) sink and USB-C PD (Power Delivery) source power modes and negotiate a connection with Ethernet devices that exclusively use 1000 Mbps Ethernet without needing additional software or an external USB-to-Ethernet adapter.

According to a first aspect of the invention there is a 'cinema camera communication and control device' in the form of a wireless communication device for a cinema camera comprising a circuit board having a processor, an algorithm, a power connection to a power source, and a wireless communication means housed within a chassis in the form of a rectangular box, a recessed antenna connection, a remote antenna mount, and an externally operating application to configure an operation of said wireless communication device.

According to a second aspect of the present invention there is a cinema camera communication and control device in the form of a wireless communication device for use on a cinema camera comprising a circuit board having a processor, an algorithm, a power connection to a power source, and a wireless communication means housed within a chassis in the form of a rectangular box having a cheese plate having a first end opposite from and symmetrical to a second end comprising a first slot and a second slot positioned parallel to each other across a middle of said cheese plate said first slot and said second slot having an open channel through said cheese plate configured to pass an attachment means, such as a strap or an elastic band, through said cheese plate for attaching said wireless communication device to an external device using said attachment means, a first screw positioned and configured for attaching said cheese plate to said rectangular box, a screw hole for attaching said wireless communication device by a second screw to an external device such as a chassis of a camera, a self engaging and disengaging interlock, such as a first ball and spring plunger paired with a second ball and spring plunger which each mate to a countersink in a set of screw holes, on said cheese plate on said wireless communication device which is configured to enable a first locked position for said wireless communication device in a place using said screw to maintain a position and configured to enable a flexibility to rotate said wireless communication device ninety degrees or one hundred eighty degrees about said position and provide a second and third locked position for said wireless communication device, a recessed antenna connection, a remote antenna mount, and an externally operating application to configure an operation of said wireless communication device.

According to a third aspect of the present invention there is a wireless communication device wherein said power source comprises power from a connection to a DC source and/or a USB-C connection and wherein said algorithm dynamically switches between said DC source and/or said USB-C connection.

According to a fourth aspect of the present invention there is a wireless communication device wherein said wireless communication means comprises a communication device capable of communication with a 1000 megabit bandwidth communication device.

According to a fifth aspect of the present invention there is a wireless communication device wherein said circuit board comprises a communication layer 2 network packet switching/filtering means and/or a communication layer 3 network packet switching/filtering means.

According to a sixth aspect of the present invention there is a wireless communication device wherein said chassis comprises a cheese plate having a first end opposite from and symmetrical to a second end.

According to a seventh aspect of the present invention there is a wireless communication device wherein said cheese plate comprises a first slot and a second slot positioned parallel to each other across a middle of said cheese plate, said first slot and said second slot having an open channel through said cheese plate configured to pass an attachment means, such as a strap or an elastic band, through said cheese plate for attaching said wireless communication device to an external device using said attachment means.

According to an eighth aspect of the present invention there is a wireless communication device wherein said cheese plate comprises a screw positioned and configured for attaching said wireless communication device to an external device such as a chassis of a camera.

According to a ninth aspect of the present invention there is a wireless communication device wherein said cheese plate comprises a self engaging and disengaging interlock, such as a first ball and spring plunger paired with a second ball and spring plunger which each mate to a countersink in a set of screw holes, on said cheese plate on said wireless communication device.

According to a tenth aspect of the present invention there is a wireless communication device wherein said cheese plate comprises a first slot and a second slot positioned parallel to each other across a middle of said cheese plate said first slot and said second slot having an open channel through said cheese plate configured to pass an attachment means, such as a strap or an elastic band, through said cheese plate for attaching said wireless communication device to an external device using said attachment means, a first screw positioned and configured for attaching said cheese plate to said rectangular box, a screw hole for attaching said wireless communication device by a second screw to an external device such as a chassis of a camera, and a self engaging and disengaging interlock, such as a first ball and spring plunger paired with a second ball and spring plunger which each mate to a countersink in a set of screw holes, on said cheese plate on said wireless communication device which is configured to enable a first locked position for said cheese plate in a place using said first screw to maintain a position and configured to enable a flexibility to rotate said rectangular box ninety degrees or one hundred eighty degrees about said position and provide a second locked position and a third locked position for said wireless communication device.

An advantage of the present invention in comparison to available off-the-shelf devices that facilitate the wireless communication and layer 2 camera control of motion picture and television cameras is the ability to communicate with devices requiring a gigabit Ethernet link, i.e., devices that are incompatible with 10 or 100 megabit Ethernet protocols.

An advantage of the present invention is the ability to provide a network connection to a computer, supported camera, smartphone, tablet computer, or another similar supported host device directly over USB without needing to install additional software on the host device or needing to use an external USB-to-Ethernet adapter between the host device and the present invention.

Furthermore, the present invention has the ability to either be powered by a USB host device or provide power to a USB host device by connecting another means of power. The present invention can dynamically switch between those two modes.

An advantage of the present invention in comparison to available off-the-shelf devices that facilitate the wireless control of motion picture and television cameras is the ability to filter out unwanted IP traffic before it reaches the wireless communication means, such as a radio, preventing that traffic from consuming wireless link bandwidth.

An advantage of the present invention is a cheese plate system providing various mounting options without requiring any additional accessories.

An advantage of the present invention is the inclusion of an antenna mount that is designed not only to protect the connector from physical damage during transit and storage, but also to minimize the overall surface area footprint of the installed device on the mounted external device (e.g., cinema camera).

An advantage of the present invention is that it features an integrated RF spectrum analysis function with 1 MHz precision which automatically selects the operating frequency with the lowest level of interference. This analysis can also be manually run using the advanced configuration utility to aid in specialized deployments.

An advantage of the present invention is an integrated multi-port Ethernet switch, which is exposed as a physical Ethernet port on the device as well as via the integrated USB-Ethernet adapter. This allows for advanced configurations and expansion.

An advantage of the present invention in comparison to available off-the-shelf wireless Ethernet bridging devices in general is that the present invention is a design optimized for size, weight and power featuring a wireless Ethernet bridge running a minimal real-time operating system enabling nearly instantaneous startup.

The invention will now be described, by way of example only, with reference to the accompanying drawings in which:

DETAILED DESCRIPTION OF THE INVENTION

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Throughout this specification, the word "comprise," or variations thereof such as "comprises" or "comprising," will be understood to imply the inclusion of a stated element, integer or step, or group of elements integers or steps, but not the exclusion of any other element, integer or step, or group of elements, integers or steps.

Throughout this specification, the word "bitbox," or variations thereof such as "BitBox," will be understood to imply the device of the present invention.

Figure 1:
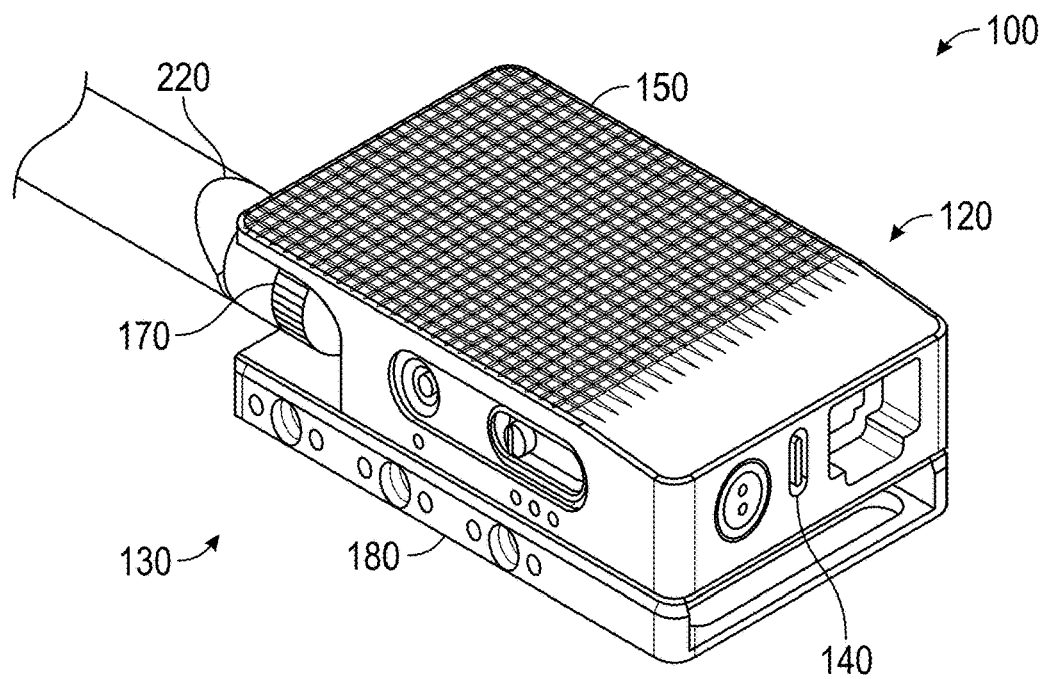
FIG. 1 is a perspective view of the wireless communication device comprising a circuit board having a processor, an algorithm, and a power connection to a power source according to the invention.
Figure 2:
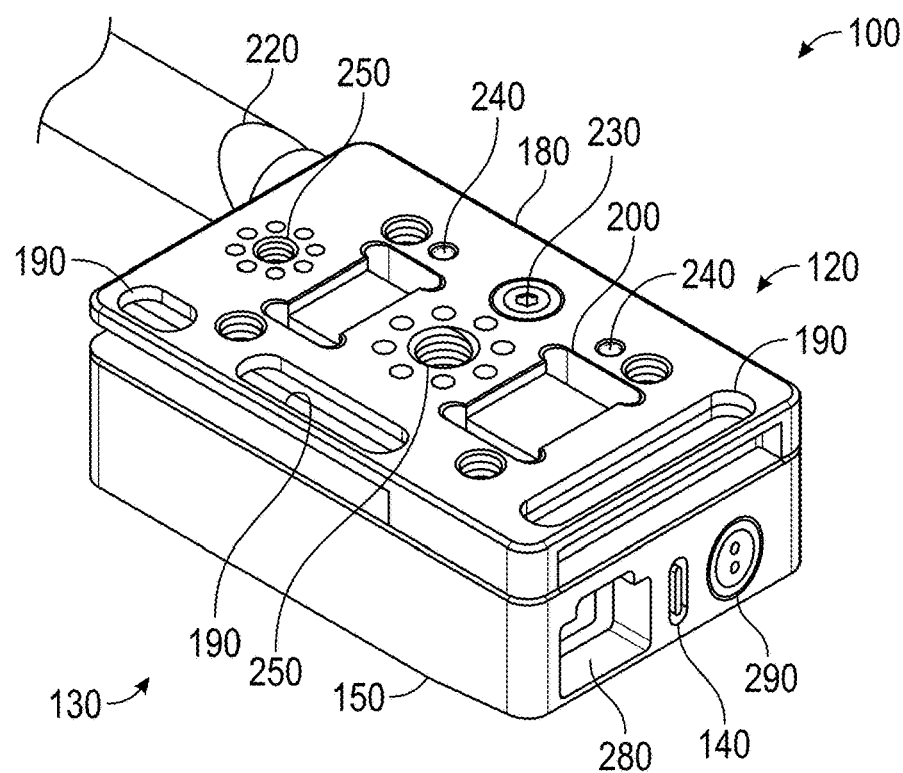
FIG. 2 is a perspective view showing the back of the device with a cheese plate attached according to the invention.
Figure 3:
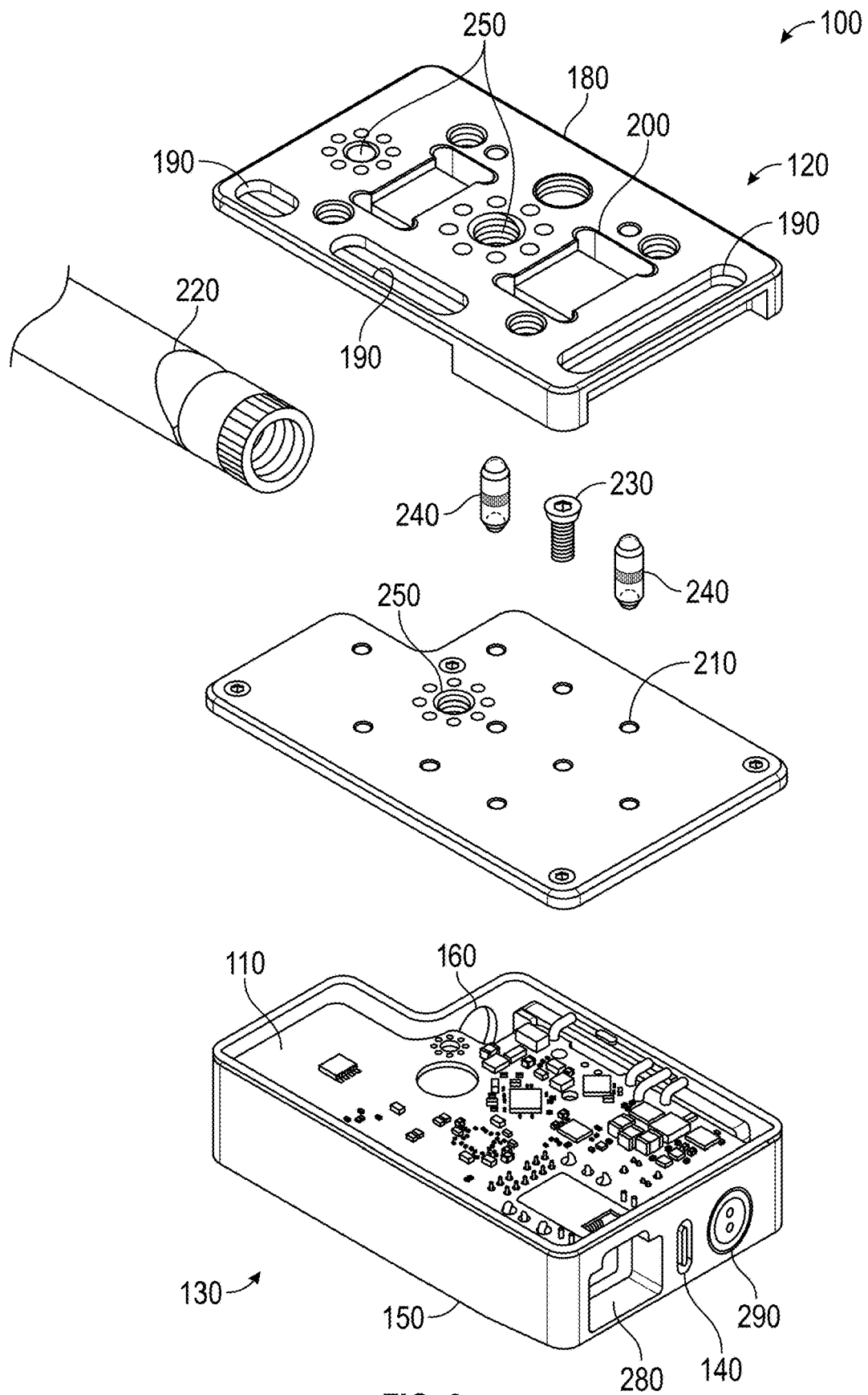
FIG. 3 is an exploded view showing a cheese plate, the back of the device, and the circuit board inside of the device according to the invention.
Figure 4:
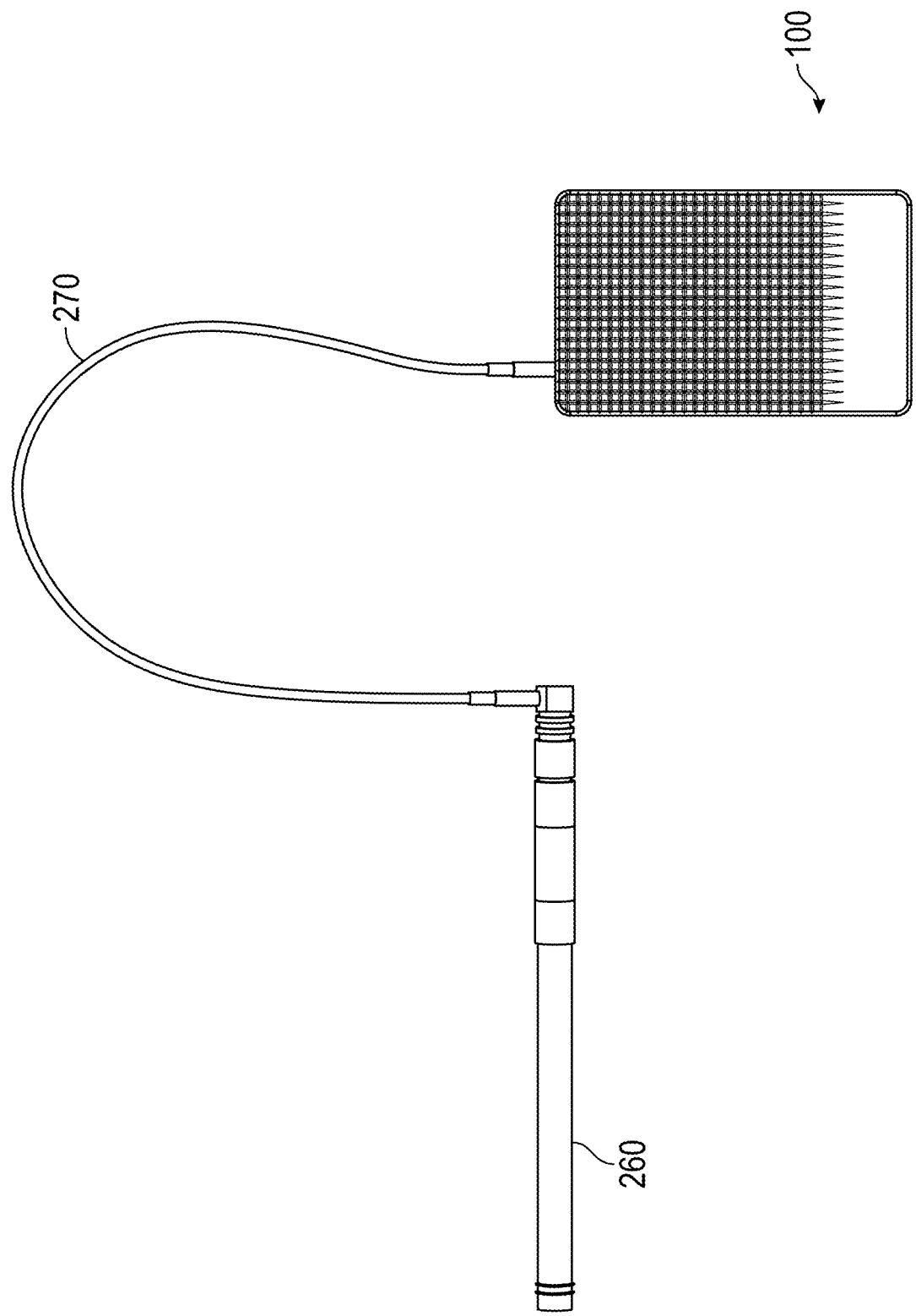
FIG. 4 is a top view showing the device connected by cable to an external antenna according to the invention.

Index of Labeled Features in Figures. Features are listed in numeric order by Figure in numeric order. Referring to the Figures, there is shown in FIGS. 1, 2, 3, and 4 the following features:

Element 100 which is a cinema camera communication and control device.
Element 110 which is a circuit board.
Element 120 which is a processor.
Element 130 which is an algorithm.
Element 140 which is a USB-C connector.
Element 150 which is a chassis in the form of a rectangular box.
Element 160 which is a recessed antenna connection.
Element 170 which is a remote antenna mount/connector.
Element 180 which is a cheese plate.
Element 190 which is a slot for screws.
Element 200 which is a slot positioned across a cheese plate 180.
Element 210 which is a threaded screw hole.
Element 220 which is an external antenna connected to the wireless communication device.
Element 230 which is a screw positioned and configured for attaching said cheese plate 180 to said chassis in the form of a rectangular box.
Element 240 which is a pair of ball and spring plungers.
Element 250 which is a set of openings on a cheese plate 180 or chassis 150 which can be used to attach other objects to said cheese plate 180.
Element 260 which is an external antenna connected by a cable to the wireless communication device 100.
Element 270 which is a cable from the wireless communication device 100 to an external antenna.
Element 280 which is an Ethernet port.
Element 290 which is a DC power connection point.

In a first preferred embodiment of the present invention there is a wireless communication device for a cinema camera 100 comprising a circuit board 110 having a processor 120, an algorithm 130, a power connection to a power source, and a wireless communication means housed within a chassis in the form of a rectangular box 150, a recessed antenna connection 160, a remote antenna mount 170, and an externally operating application to configure an operation of said wireless communication device 100.

In an alternative embodiment of the first preferred embodiment there is a wireless communication device 100 wherein said power source comprises power from a connection to a DC source and/or a USB-C connection and wherein said algorithm 130 dynamically switches between said DC source and/or said USB-C connection. Sink mode is wherein the DC power input is not used to carry power and the USB-C port acts as a connector able to carry power or carry both power and data simultaneously. Source mode is wherein the DC power input is a connector able to carry power and the USB-C port acts as a connector able to provide power, carry data, or both simultaneously.

Regarding said power source, dynamically switching between said DC source and/or said USB-C connections works as follows. Begin by connecting the external power source to a DC power input of the bitbox. The bitbox will power on. Connect a USB-C cable 270 between the bitbox and an external device such as a tablet computer. The bitbox will send power to the tablet computer over the USB-C connection (source mode). The tablet computer charges its internal battery from the bitbox. If the external power source is disconnected from the bitbox's DC power input connector at this stage, the bitbox will re-negotiate the USB-C connection with the tablet computer and begin receiving power from the tablet computer (i.e., sink mode). The bitbox is now running from the internal battery of the tablet computer. If the external power source is connected to the bitbox's DC power input connector, the bitbox will re-negotiate the USB-C connection with the tablet computer again and begin sending power to the tablet computer once more (i.e., source mode). This illustrates "hot-swapping" the bitbox's power source between external DC input and USB-C input, dynamically changing between USB-C sink and USB-C source power modes. This feature also makes it possible to power the bitbox exclusively with the USB-C connector 140 from the beginning (e.g., by connecting it to a computer).

In an alternative embodiment of the first preferred embodiment there is a wireless communication device 100 wherein said wireless communication means comprises a communication device capable of communication with a 1000 megabit bandwidth communication device.

In an alternative embodiment of the first preferred embodiment there is a wireless communication device 100 wherein said circuit board 110 comprises a communication layer 2 network packet switching/filtering means and/or a communication layer 3 network packet switching/filtering means.

In an alternative embodiment of the first preferred embodiment there is a wireless communication device 100 wherein said chassis 150 comprises a cheese plate 180 having a first end opposite from and symmetrical to a second end. The ends of the cheese plate 180 are symmetrical so that it can be mounted in either (up or down) direction.

In an alternative embodiment of the first preferred embodiment there is a wireless communication device 100 wherein said cheese plate 180 comprises a first slot 200 and a second slot 200 positioned parallel to each other across a middle of said cheese plate 180, said first slot 200 and said second slot 200 having an open channel through said cheese plate 180 configured to pass an attachment means, such as a strap, an elastic band, a length of cord, or a length of wire, through said cheese plate 180 for attaching said wireless communication device 100 to an external device using said attachment means.

In an alternative embodiment of the first preferred embodiment there is a wireless communication device 100 wherein said cheese plate 180 comprises a screw 230 positioned and configured for attaching said wireless communication device 100 to an external device such as a chassis 150 of a camera.

In an alternative embodiment of the first preferred embodiment there is a wireless communication device 100 wherein said cheese plate 180 comprises a self engaging and disengaging interlock, such as a first ball and spring plunger paired with a second ball and spring plunger 240 which each mate to a countersink in a set of screw holes 210, on said cheese plate 180 on said wireless communication device 100.

In an alternative embodiment of the first preferred embodiment there is a wireless communication device 100 wherein said cheese plate 180 comprises a first slot 200 and a second slot 200 positioned parallel to each other across a middle of said cheese plate 180 said first slot 200 and said second slot 200 having an open channel through said cheese plate 180 configured to pass an attachment means (such as a strap, an elastic band, a length of cord, or a length of wire) through said cheese plate 180 for attaching said wireless communication device 100 to an external device or object (such as a pole or post) using said attachment means, a first screw 230 positioned and configured for attaching said cheese plate 180 to said rectangular box, a screw hole 210 for attaching said wireless communication device 100 by a second screw 230 to an external device (such as a chassis of a camera or cinema camera), and a self engaging and disengaging interlock (such as a first ball and spring plunger paired with a second ball and spring plunger 240 which each mate to a countersink in a set of screw holes 210) on said cheese plate 180 on said wireless communication device 100 which is configured to enable a first locked position for said cheese plate 180 in a place using said first screw 230 to maintain a position and configured to enable a flexibility to rotate said rectangular box ninety degrees or one hundred eighty degrees about said position and provide a second locked position and a third locked position for said wireless communication device 100.

In a second preferred embodiment of the present invention there is a wireless communication device 100 for use on a cinema camera comprising a circuit board 110 having a processor 120, an algorithm 130, a power connection to a power source, and a wireless communication means housed within a chassis in the form of a rectangular box 150 having a cheese plate 180 having a first end opposite from and symmetrical to a second end comprising a first slot 200 and a second slot 200 positioned parallel to each other across a middle of said cheese plate 180 said first slot 200 and said second slot 200 having an open channel through said cheese plate 180 configured to pass an attachment means (such as a strap, an elastic band, a length of cord, or a length of wire) through said cheese plate 180 for attaching said wireless communication device 100 to an external device or object (such as a pole or post) using said attachment means, a first screw 230 positioned and configured for attaching said cheese plate 180 to said rectangular box, a screw hole 210 for attaching said wireless communication device 100 by a second screw 230 to an external device (such as a chassis of a camera or cinema camera), a self engaging and disengaging interlock (such as a first ball and spring plunger paired with a second ball and spring plunger 240 which each mate to a countersink in a set of screw holes 210) on said cheese plate 180 on said wireless communication device 100 which is configured to enable a first locked position for said wireless communication device 100 in a place using said screw 230 to maintain a position and configured to enable a flexibility to rotate said wireless communication device 100 ninety degrees or one hundred eighty degrees about said position and provide a second and third locked position for said wireless communication device 100, a recessed antenna connection 160, a remote antenna mount 170, and an externally operating application to configure an operation of said wireless communication device 100.

In an alternative embodiment of the second preferred embodiment there is a wireless communication device 100 wherein said power source comprises power from a connection to a DC source and/or a USB-C connection and wherein said algorithm 130 dynamically switches between any of said DC source and/or said USB-C connection.

In an alternative embodiment of the second preferred embodiment there is a wireless communication device 100 wherein said wireless communication means comprises a communication device capable of communication with a 1000 megabit bandwidth communication device.

In an alternative embodiment of the second preferred embodiment there is a wireless communication device 100 wherein said circuit board 110 comprises a communication layer 2 network packet switching/filtering means and/or a communication layer 3 network packet switching/filtering means.

The device of the present invention (bitbox) is best enabled in the very particular unique design of the case with a cheese plate 180 as shown in the figures wherein said cheese plate 180 includes a plurality of slots in the middle with a channel or channels between them designed to allow an attachment method, such as a hook and loop strap or elastic band (such as a "bongo tie"), to pass through for attaching to an external device or object, such as a pole or a post, also having a screw 230 to attach it to a camera chassis 150 and a pair of ball and spring plungers 240 which mate to the countersink of the screw holes 210 on the bitbox.

The device of the present invention allows a user to lock the wireless communication device 100 into a first fixed position or place with just one screw 230 while maintaining the position flexibility. A user can actually rotate the device of the present invention ninety degrees or one hundred eighty degrees and the device of the present invention will lock into a second or third fixed position or place after rotation of said device. On the bitbox the same screw holes 210 accommodate both the main screw 230 attaching the cheese plate 180 to the bitbox itself and the ball and spring plungers 240; one set of holes on the bitbox serves both functions.

There are numerous threaded screw holes 210 on the rectangular box that interface with the ball and spring plungers 240 and the attachment screw 230 by passing through the slots and openings 250 of the cheese plate 180. The rectangular box accepts screws 230 and ball and spring plungers 240 in any one of its threaded screw holes 210. There are numerous configurations for affixing the cheese plate 180 to the rectangular box by lining up any two threaded screw holes 210 on the rectangular box and any two slots or openings 250 on the cheese plate 180 and passing through them with one or more screw(s) 230 and one or more ball and spring plunger(s) 240 and securing the screw (s) 230 and ball and spring plunger(s) 240 in place.

In one embodiment of the invention, the set of openings 250 on a cheese plate 180 which can be used to attach other objects to said cheese plate 180 are a set of ¼ inch and ⅜ inch threaded holes on the cheese plate 180 that allows for mounting to a number of accessories. One example is that an anti-twist quick release plate can be attached by engaging with the ⅜ inch threaded hole.

To mount the cheese plate 180 and bitbox to a round or square external object such as a pole, a piece of velcro can be threaded through the slots positioned across the cheese plate 180 and wrapped around the external object.

An advantage of the present invention in comparison to available off-the-shelf devices that facilitate the wireless communication and layer 2 camera control of motion picture and television cameras is the ability to communicate with devices requiring a gigabit Ethernet link, i.e., devices that exclusively use 1000 Mbps Ethernet and are incompatible with 10 or 100 megabit Ethernet protocols. This is especially notable because the number of small wireless devices that support 10/100/1000 Mbps Ethernet is much smaller than the number of small wireless devices that support 10/100 Mbps Ethernet.

An advantage of the present invention in comparison to available off-the-shelf devices that facilitate the wireless control of motion picture and television cameras and available off-the-shelf wireless Ethernet bridging devices in general is the ability to provide a network connection to a computer, supported camera, smartphone, tablet computer, or similar supported host device directly over USB without needing to install additional software on the host device or needing to use an external USB-to-Ethernet adapter between the host device and the present invention.

An advantage of the present invention in comparison to available off-the-shelf devices that facilitate the wireless control of motion picture and television cameras and available off-the-shelf wireless Ethernet bridging devices in general is the ability to either be powered by a USB host device (i.e., sink mode) or provide power to a USB host device by connecting another means of power to the present invention (i.e, source mode). Furthermore, the present invention can dynamically switch between those two modes.

An advantage of the present invention is that the present invention is designed with such "dual role power" (DRP) mode without an internal battery. The lack of an internal battery enables the invention to be a USB-C powered device that can become a USB-C charger when fed a power source rather than simply being a power bank that dynamically switches from charging to discharging.

An advantage of the present invention in comparison to available off-the-shelf devices that facilitate the wireless control of motion picture and television cameras is that the present invention operates on network layer 2, making the present invention fully transparent to both the external device (e.g., a cinema camera) and any device being used to control the external device. The present invention appears as a physical link to the connected device.

An advantage of the present invention in comparison to available off-the-shelf devices that facilitate the wireless control of motion picture and television cameras is the ability to filter out unwanted IP traffic before it reaches the wireless communication means, such as a radio, preventing that traffic from consuming wireless link bandwidth.

An advantage of the present invention in comparison to available off-the-shelf devices that facilitate the wireless control of motion picture and television cameras is the ability to pair with a button press that does not require the manual configuration of network IDs and/or passwords.

An advantage of the present invention is the use of encryption so only devices that have been paired with each other can exchange data; simple knowledge of the wireless frequencies on which a device operates is not enough to gain access to the network.

An advantage of the present invention is a cheese plate system providing various mounting options without requiring any additional accessories.

An advantage of the present invention is the inclusion of an antenna mount that is designed not only to protect the connector from physical damage during transit and storage, but also to minimize the overall surface area footprint of the installed device on the mounted external device (e.g., cinema camera).

An advantage of the present invention is that it is ready to use out of the box with no configuration yet also supports extremely advanced configuration for specialized deployments.

An advantage of the present invention in comparison to available off-the-shelf devices that facilitate the wireless control of motion picture and television cameras is that it has an integrated RF spectrum analysis function with 1 MHz precision which automatically selects the operating frequency with the lowest level of interference. This analysis can also be manually run using the advanced configuration utility to aid in specialized deployments.

An advantage of the present invention is its operation at sub 2.4 GHz, providing it longer range and better object penetration than systems operating at higher frequencies.

An advantage of the present invention is zero configuration and rapid boot times in comparison to other solutions.

An advantage of the present invention is that no specialized hand unit is required for use or configuration. The present invention works with commodity tablet devices and computer hardware as well as specialized camera control platforms.

An advantage of the present invention is an integrated multi-port Ethernet switch, which is exposed as a physical Ethernet port 280 on the device as well as via the integrated USB-to-Ethernet adapter. This allows for advanced configurations and expansion. There is an additional internal Ethernet port 280 and internal 5$v$ auxiliary power for custom modules, further providing advanced deployment and expansion options.

An advantage of the present invention is its energy efficiency. The present invention uses very little power.

An advantage of the present invention is that the present invention is among the physically smallest of wireless Ethernet bridging devices which can communicate with devices that require a gigabit Ethernet link and cannot communicate using 10 or 100 megabit Ethernet protocols.

An advantage of the present invention in comparison to available off-the-shelf wireless Ethernet bridging devices in general is that the present invention is a design optimized for size, weight, and power featuring a wireless Ethernet bridge running a minimal real-time operating system enabling nearly instantaneous startup. There are available today numerous wireless Ethernet bridging devices that run the Linux operating system, however, all of them take approximately 30-90 seconds from applying power to wirelessly transmitting data. The present invention takes approximately 5 seconds.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

Although the invention has been explained in relation to various embodiments, it is to be understood that many other possible modifications and variations can be made without departing from the spirit and scope of the invention.

The invention claimed is:

1. A wireless communication device for a cinema camera comprising
   a circuit board having a processor, an algorithm, a power connection to a power source, and a wireless communication means housed within
   a chassis in the form of a rectangular box,
   a recessed antenna connection,
   a remote antenna mount, and
   an externally operating application to configure an operation of said wireless communication device,
   wherein said chassis comprises a cheese plate having a first end opposite from and symmetrical to a second end comprising
      a first slot and a second slot positioned parallel to each other across a middle of said cheese plate said first slot and said second slot having an open channel through said cheese plate configured to pass an attachment means, such as a strap or an elastic band, through said cheese plate for attaching said wireless communication device to an external device using said attachment means,
      a first screw positioned and configured for attaching said cheese plate to said rectangular box,
      a screw hole for attaching said wireless communication device by a second screw to an external device such as a chassis of a camera, and
      a self engaging and disengaging interlock, such as a first ball and spring plunger paired with a second ball and spring plunger which each mate to a countersink in a set of screw holes, on said cheese plate on said wireless communication device which is configured to enable a first locked position for said cheese plate in a place using said first screw to maintain a position and configured to enable a flexibility to rotate said rectangular box ninety degrees or one hundred eighty degrees about said position and provide a second locked position and a third locked position for said wireless communication device.

2. The wireless communication device of claim 1 wherein said power source comprises power from a connection to a DC source and/or a USB-C connection and wherein said algorithm dynamically switches between said DC source and/or said USB-C connection.

3. The wireless communication device of claim 1 wherein said wireless communication means comprises a communication device capable of communication with a 1000 megabit bandwidth communication device.

4. The wireless communication device of claim 1 wherein said circuit board comprises a communication layer 2 network packet switching/filtering means and/or a communication layer 3 network packet switching/filtering means.

5. The wireless communication device of claim 1 wherein said cheese plate comprises a first slot and a second slot positioned parallel to each other across a middle of said cheese plate, said first slot and said second slot having an open channel through said cheese plate configured to pass an attachment means, such as a strap or an elastic band, through said cheese plate for attaching said wireless communication device to an external device using said attachment means.

6. The wireless communication device of claim 1 wherein said cheese plate comprises a screw positioned and configured for attaching said wireless communication device to an external device such as a chassis of a camera.

7. The wireless communication device of claim 1 wherein said cheese plate comprises a self-engaging and disengaging interlock, including:
   a first ball and spring plunger and a second ball and spring plunger, each configured to mate with a countersink in a set of screw holes;
   said interlock enabling the wireless communication device to be positioned in a first locked position and further allowing rotation to a second locked position and a third locked position about the axis of a mounting screw, wherein said rotation provides angular flexibility while maintaining a secure attachment to an external device.

8. A wireless communication device for use on a cinema camera comprising
   a circuit board having a processor, an algorithm, a power connection to a power source, and a wireless communication means housed within
   a chassis in the form of a rectangular box having a cheese plate having a first end opposite from and symmetrical to a second end comprising
      a first slot and a second slot positioned parallel to each other across a middle of said cheese plate said first slot and said second slot having an open channel through said cheese plate configured to pass an attachment means, such as a strap or an elastic band, through said cheese plate for attaching said wireless communication device to an external device using said attachment means, a first screw positioned and configured for attaching said cheese plate to said rectangular box, a screw hole for attaching said wireless communication device by a second screw to an external device such as a chassis of a camera, a self engaging and disengaging interlock, such as a first ball and spring plunger paired with a second ball and spring plunger which each mate to a countersink in a set of screw holes, on said cheese plate on said wireless communication device which is configured to enable a first locked position for said wireless communication device in a place using said first screw to maintain a position and configured to enable a flexibility to rotate said wireless communication device ninety degrees or one hundred eighty degrees about said position and provide a second and third locked position for said wireless communication device, a recessed antenna connection, a remote antenna mount, and an externally operating application to configure an operation of said wireless communication device.

9. The wireless communication device of claim 8 wherein said power source comprises power from a connection to a DC source and/or a USB-C connection and wherein said algorithm dynamically switches between any of said DC source and/or said USB-C connection.

10. The wireless communication device of claim 8 wherein said wireless communication means comprises a communication device capable of communication with a 1000 megabit bandwidth communication device.

11. The wireless communication device of claim 8 wherein said circuit board comprises a communication layer 2 network packet switching/filtering means and/or a communication layer 3 network packet switching/filtering means.

* * * * *